United States Patent
Rollins et al.

(10) Patent No.: US 9,074,563 B2
(45) Date of Patent: Jul. 7, 2015

(54) ENGINE SYSTEM HAVING A CONDENSATE BYPASS DUCT

(71) Applicant: Ford Global Technologies, LLC, Dearborn, MI (US)

(72) Inventors: Scott M. Rollins, Canton, MI (US); Christopher B. Bishop, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 13/961,607

(22) Filed: Aug. 7, 2013

(65) Prior Publication Data

US 2015/0040877 A1 Feb. 12, 2015

(51) Int. Cl.
| | |
|---|---|
| *F02D 41/08* | (2006.01) |
| *F02M 35/10* | (2006.01) |
| *F02M 25/06* | (2006.01) |
| *F01M 13/02* | (2006.01) |

(52) U.S. Cl.
CPC ......... *F02M 35/10222* (2013.01); *F02M 25/06* (2013.01); *F01M 13/02* (2013.01); *Y02T 10/121* (2013.01)

(58) Field of Classification Search
CPC ... F02M 13/00; F02M 13/021; F02M 13/022; F02M 13/025; F02M 26/06; F02M 35/10; F02M 35/10144
USPC .............................. 123/572–574, 585, 184.21
See application file for complete search history.

(56) References Cited

U.S. PATENT DOCUMENTS

| | | | |
|---|---|---|---|
| 4,478,186 A * | 10/1984 | Bauer et al. .................... 123/436 |
| 5,080,061 A * | 1/1992 | Nishimura ............... 123/339.15 |
| 5,417,195 A * | 5/1995 | Tachikawa et al. ........... 123/585 |
| 6,601,572 B2 | 8/2003 | Okamoto |
| 6,782,878 B2 | 8/2004 | Spix |
| 6,814,051 B2 | 11/2004 | Suzuki |
| 6,843,224 B2 * | 1/2005 | Ha ................................ 123/337 |
| 7,845,341 B2 | 12/2010 | Lewis et al. |
| 8,205,604 B2 | 6/2012 | Velosa et al. |
| 8,267,073 B2 | 9/2012 | Kado et al. |
| 2001/0010214 A1* | 8/2001 | Maegawa et al. ........ 123/339.23 |
| 2004/0040536 A1 | 3/2004 | Suzuki |
| 2004/0112325 A1* | 6/2004 | Criddle et al. ............. 123/198 E |
| 2005/0235940 A1* | 10/2005 | Shimatsu .................. 123/184.21 |
| 2008/0295814 A1* | 12/2008 | Breuninger et al. .......... 123/572 |
| 2012/0006306 A1* | 1/2012 | Boehm et al. ................. 123/572 |
| 2014/0034030 A1* | 2/2014 | Jaasma ......................... 123/572 |
| 2014/0076294 A1* | 3/2014 | Ulrey et al. ................... 123/572 |

FOREIGN PATENT DOCUMENTS

WO 2012157113 A1 11/2012

OTHER PUBLICATIONS

Rollins, Scott M. et al., "Air Intake Duct Ice Ingestion Features," U.S. Appl. No. 13/968,306, filed Aug. 15, 2013, 39 pages.

\* cited by examiner

*Primary Examiner* — Marguerite McMahon
(74) *Attorney, Agent, or Firm* — Julia Voutyras; Alleman Hall McCoy Russell & Tuttle LLP

(57) ABSTRACT

An engine system is provided. The engine system includes an intake conduit positioned upstream of an engine cylinder and also includes a PCV outlet opening into the intake conduit. The engine system further includes a condensate bypass duct in parallel fluidic communication with and vertically below the intake conduit, the condensate bypass duct including a duct inlet opening into the intake conduit and a duct outlet opening into the intake conduit.

19 Claims, 3 Drawing Sheets

ENGINE SYSTEM HAVING A CONDENSATE
BYPASS DUCT

FIELD

The present disclosure relates to an engine system having a condensate bypass duct.

BACKGROUND AND SUMMARY

Positive crankcase ventilation (PCV) systems may be included in engines to reduce emissions of blow-by gasses from the crankcase. PCV systems may include a conduits providing fresh intake air into the crankcase and flowing crankcase gasses including blow-by gasses into the intake system. Routing the blow-by gasses back into the intake system for subsequent combustion reduces engine emissions. Consequently, the engine's environmental impact is reduced.

U.S. Pat. No. 8,267,073 discloses a PCV system flowing blow-by gases from a crankcase into an intake system to reduce emission. The PCV system includes condensate grooves integrated into an intake conduit in an attempt to guide condensate flowing from a PCV outlet opening into the intake conduit.

However, the inventors have recognized several drawbacks with the PCV system disclosed in U.S. Pat. No. 8,267,073. For instance, ice may form in the condensation grooves during engine shutdown. As a result, downstream components such as a throttle may become damaged when the engine is started up again. Moreover, the grooves may not trap enough of the condensate formed in the intake conduit. Consequently, combustion operation may be degraded due to the presence of condensate in the intake air. Further still, the grooves may increase losses in the PCV system disclosed in U.S. Pat. No. 8,267,073.

The inventors herein have recognized the above issues and developed an engine system. The engine system includes an intake conduit positioned upstream of an engine cylinder and also includes a PCV outlet opening into the intake conduit. The engine system further includes a condensate bypass duct in parallel fluidic communication with and vertically below the intake conduit, the condensate bypass duct including a duct inlet opening into the intake conduit and a duct outlet opening into the intake conduit.

The position of the condensate bypass duct relative to the intake conduit enables the condensate bypass duct to collect condensate from the intake conduit, such as condensate generated in a PCV system and flowing from the PCV outlet. As a result, condensate may be trapped in the bypass duct, thereby reducing the likelihood of condensate flowing in a liquid or solid form from the intake conduit to downstream components such as a throttle and/or compressor. Therefore, the likelihood of component degradation from ice is reduced. Moreover, combustion operation may be improved due to the reduction in condensate flowed into the engine cylinder. In one example, the diameter of the condensate bypass duct reduces in a downstream direction. This additional opening aids in the collection of condensate in the bypass duct while the reduced orifice size controls the release of the condensate back into the airflow at a desired rate, such as a rate that does not degrade engine performance.

It will be appreciated that the condensate bypass duct may receive condensate from the intake conduit due to its location below one of the sources of condensation (i.e., the PCV outlet). As a result, the likelihood of liquid or solid condensate flowing to downstream components, such as a throttle and/or compressor, is reduced, thereby increasing component longevity and improving combustion operation. Thus, the technical result achieved via the aforementioned engine system may include increasing the system's longevity and improving combustion operation in the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

An engine system having a condensate bypass duct for collecting condensation upstream of an engine cylinder is described herein. The condensate bypass duct collects condensate from an intake conduit due to the location of the bypass duct in relation to the PCV outlet. It will be appreciated that at least some of the condensate may come from the PCV outlet. Collecting the condensate via the bypass duct, reduces the amount of condensate (e.g., liquid and/or solid) to downstream components such as a throttle, compressor, etc. Consequently, combustion operation may be improved when a condensate bypass duct is utilized in the engine system, by reducing the amount of condensate flowed into the cylinders. Moreover, the likelihood of component damage to for example a throttle and/or a compressor from frozen condensate is reduced. As a result, engine operation and component longevity is improved.

Figure 1:
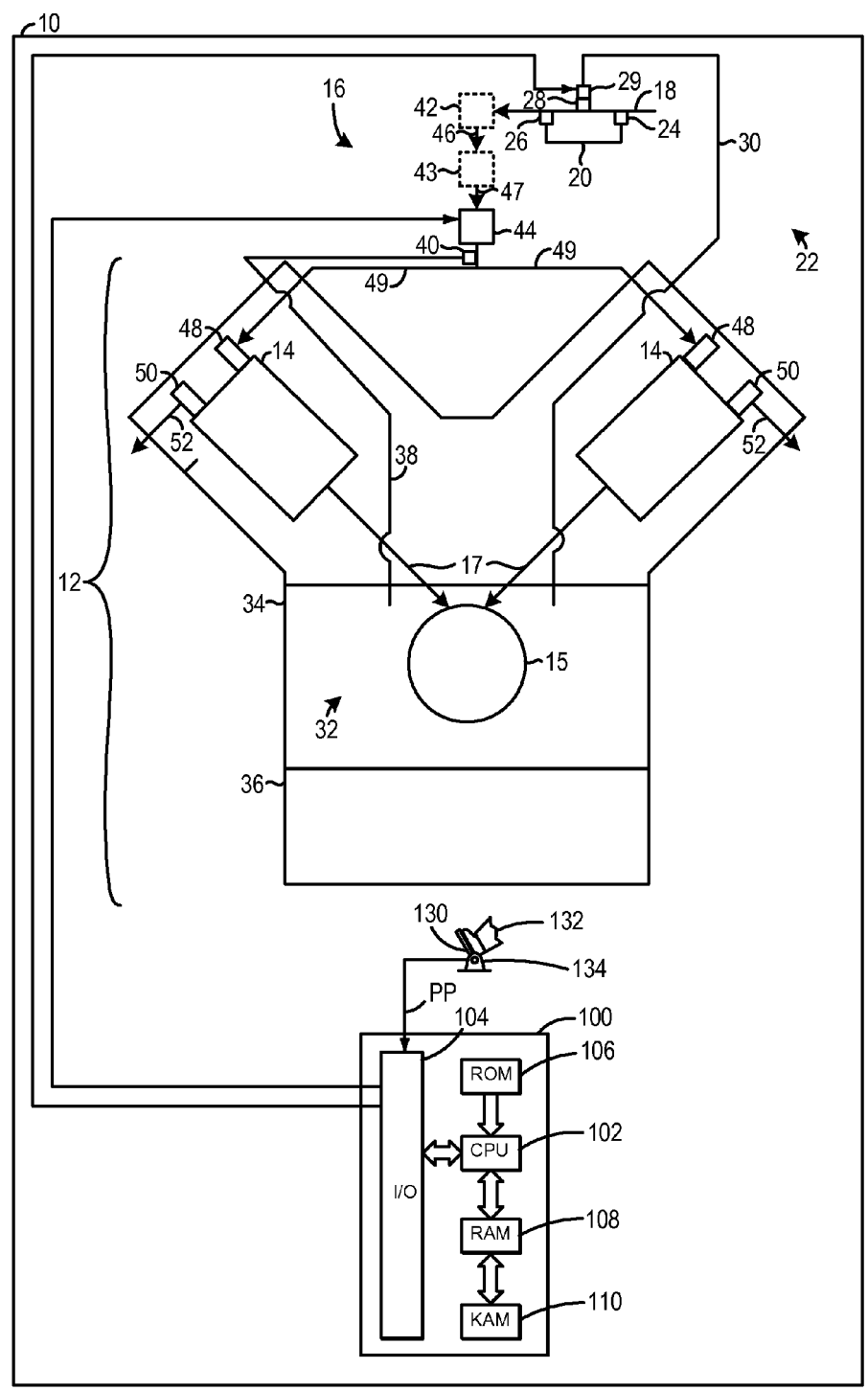
FIG. 1 shows a schematic depiction of a vehicle having an engine and a positive crankcase ventilation system.

FIG. 1 shows a schematic depiction of a vehicle 10 including an engine 12. The engine 12 is configured to implement combustion operation. For example, a four stroke combustion cycle may be implemented including an intake stroke, a compression stroke, a power stroke, and an exhaust stroke. However, other types of combustion cycles may be utilized in other examples. In this way, motive power may be generated in the vehicle 10. It will be appreciated that the engine may be coupled to a transmission for transferring rotation power generated in the engine to wheels in the vehicle.

The engine 12 includes cylinders 14. Specifically, the depicted engine includes two cylinders arranged in a V-configuration. However, engines having a different number of cylinders and configurations have been contemplated. For instance, the cylinder may be arranged in an inline configuration where the cylinders are positioned in a straight line, a horizontally opposed configuration, etc. Additionally, in one example the engine may include a single cylinder. The cylinders 14 are mechanically coupled to a crankshaft 15. The mechanical coupling between the cylinders 14 and the crankshaft 15 is denoted via arrow 17.

An intake system 16 is configured to provide air to the cylinders 14. The intake system 16 may include a variety of components such as an intake conduit, indicated via arrow 18. A condensate bypass duct 20 is also shown in FIG. 1. The condensate bypass duct 20 may be included in the intake system 16 and/or a positive crankcase ventilation (PCV) system 22.

The condensate bypass duct 20 includes a duct inlet 24 and a duct outlet 26. The duct inlet 24 opens into the intake conduit 18 at a position upstream of a PCV outlet 28. The PCV outlet 28 is included in the PCV system 22. A PCV valve 29 may also be included in the PCV system 22. The PCV valve 29 may be configured to adjust the amount of crankcase gases flowing from the PCV outlet 28 to the intake conduit 18. The duct outlet 26 opens into the intake conduit 18 at a position downstream of the PCV outlet 28. As shown, the condensate bypass duct 20 is in parallel fluidic communication with the intake conduit 18. However, other bypass duct configurations have been contemplated. Additionally, the condensate bypass duct 20 is not in direct fluidic communication with components other than the intake conduit 18 along its length, in the depicted example. It will be appreciated that direct fluidic communication means that there are not any components positioned between the two components in fluidic communication. However, in other examples the condensate bypass duct 20 may be in fluidic communication with additional components along its length.

The PCV outlet 28 is included in a PCV conduit 30 in fluidic communication with a crankcase 32. The crankcase 32 is a sealed crankcase in the depicted example. The crankcase 32 has the crankshaft 15 positioned therein. The crankcase 32 may include portions of a cylinder block 34 and an oil pan 36, in one example. The oil pan 36 may be configured to receive oil from a lubrication system.

The PCV system 22 further includes a PCV inlet conduit 38. The PCV inlet conduit 38 may be in fluidic communication with one of the intake conduits 49 via an inlet port 40. However, in other examples the inlet port may be in fluidic communication with the surrounding environment.

Additionally, the intake system 16 further includes a compressor 42 positioned downstream of the intake conduit 18. A throttle 44 is also included in the intake system 16 and positioned downstream of the compressor 42 and the intake conduit 18. Thus, the compressor 42 and the throttle 44 are positioned downstream of the PCV outlet 28. A charge air cooler 43 may also be intake system 16, in one example. The charger air cooler 43 may be configured to remove heat from the intake air flowing through the cooler to reduce the temperature of the intake air downstream of the compressor. However, in other examples the compressor 42 and/or charger air cooler 43 may not be included in the intake system 16.

The compressor 42 may be mechanically coupled to the crankshaft 15, in one example. However, in other examples the compressor may be mechanically coupled to a turbine included in an exhaust system. Arrow 46 denotes the fluidic communication between the compressor 42 and the charge air cooler 43 and arrow 47 denotes the fluidic communication between the charge air cooler 43 and the throttle 44. Thus, one or more conduits may provide the aforementioned fluidic communication. The throttle 44 is in fluidic communication with intake valves 48 coupled to the cylinders 14. Arrows 49 denote the fluidic communication between the intake valves and the cylinders. It will be appreciated that one or more intake conduits, manifolds, etc., may provide the fluidic communication. The intake valves 48 are configured to be actuated to inhibit and permit intake airflow into the cylinders 14. Exhaust valve 50 are also coupled to the cylinders 14. The exhaust valves 50 are configured for actuation to inhibit and permit exhaust gas flow into exhaust conduits 52. The exhaust conduits are included in an exhaust system which may include one or more turbines, manifolds, conduits, passages, emission control devices (e.g., catalysts, filters, etc.), mufflers, etc.

A controller 100 may be included in the vehicle. The controller 100 may be configured to receive signals from sensors in the vehicle as well as send command signals to components.

Various components in the vehicle 10 may be controlled at least partially by a control system including the controller 100 and by input from a vehicle operator 132 via an input device 130. In this example, input device 130 includes an accelerator pedal and a pedal position sensor 134 for generating a proportional pedal position signal PP. The controller 100 is shown in FIG. 1 as a microcomputer, including processor 102 (e.g., microprocessor unit), input/output ports 104, an electronic storage medium for executable programs and calibration values shown as read only memory 106 (e.g., read only memory chip) in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. As shown, the throttle 44 and the PCV valve 29 may receive control signals from the controller 100. However, in other examples the PCV valve 29 may be passively operated. Furthermore, it will be appreciated that the vehicle may further include a fuel delivery system which may include a fuel tank, fuel pump, fuel rail, fuel injectors (e.g., port fuel injector and/or direct fuel injector), etc.

Figure 2:
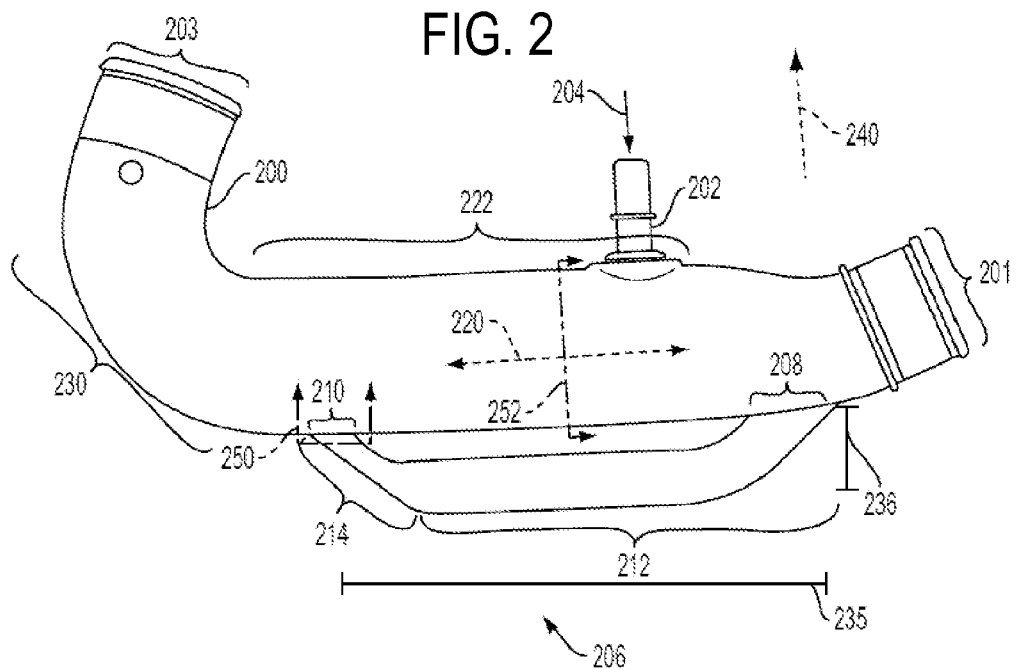
FIG. 2 shows an example intake conduit and condensate bypass duct.

FIG. 2 shows an example intake conduit 200. The intake conduit 200 may be similar to the intake conduit 18 shown in FIG. 1. Thus, the intake conduit 200 is positioned upstream of an engine cylinder. Specifically in one example, the intake conduit 200 may be positioned upstream of at least one of a compressor and a throttle, such as the compressor 42 and/or throttle 44 shown in FIG. 1. The intake conduit 200 includes an inlet 201 and an outlet 203. The inlet may be in fluidic communication with upstream components such as a filter and the outlet 203 may be in fluidic communication with downstream components such as a throttle, a compressor, etc. As shown, the outlet 203 is positioned downstream of a curved section of the intake conduit 200. It will be appreciated that the curved section 230 extends in a vertical direction.

A PCV outlet 202 is also shown in FIG. 2. The PCV outlet 202 opens into the intake conduit 200. Arrow 204 indicates the fluidic communication between a sealed crankcase and the PCV outlet 202. It will be appreciated that a PCV conduit may provide the fluidic communication between the sealed crankcase and the PCV outlet 202.

A condensate bypass duct 206 is also shown in FIG. 2. The bypass duct 206 may be similar to the bypass duct 20 shown in FIG. 1. The condensate bypass duct 206 includes a duct inlet 208 and a duct outlet 210. In one example, the duct inlet 208 and the duct outlet 210 may have an equivalent vertical height. However in another example, the vertical heights of the duct inlet and the duct outlet may vary. The bypass duct 206 is positioned vertically below the intake conduit 200.

Additionally, the duct inlet 208 is positioned upstream of the PCV outlet 202 and the duct outlet 210 is positioned downstream of the PCV outlet 202. However, other duct inlet and/or outlet positions have been contemplated. A vertical axis 240, relative to gravity, is provided for reference, to illustrate that the bypass is below, with respect to a vertical axis, the air duct (e.g. with respect to gravity and a road surface on which a vehicle having the bypass duct is positioned). However, other vertical axis orientations have been contemplated. The condensate bypass duct 206 includes a first section 212 and a second section 214. The first section 212 has a greater diameter than the second section 214. Thus, the diameter of the bypass duct 206 decreases in a downstream direction. As shown, the diameter does not decrease at a constant rate. However, other bypass duct geometries have been contemplated. As shown, portions of the condensate bypass duct 206 are curved. Additionally, the condensate bypass duct 206 may have a clear path along its length from the outlet 210 to the inlet 208 when a filter is not positioned in the outlet 210. In other words, the condensate bypass duct 206 may be unobstructed.

It will be appreciated that due to the placement of the bypass duct 206 below the intake conduit 200, condensate in the intake conduit may be flowed into the bypass duct. In this way, condensate may be collected in the bypass duct, thereby reducing the amount of condensate flowing downstream of the intake conduit. Specifically, the condensate bypass duct may collect condensate and in some examples the condensate may freeze due to the ambient temperature outside of the engine. Subsequently due to the position and geometry of the conduit the frozen condensate may be contained within the bypass duct. As a result, frozen condensate is substantially inhibited from flowing to downstream components and damaging the components. In this way, the longevity of the intake system is increased. Moreover, combustion operation in the cylinder may be improved when the amount of condensate flowing into the cylinder is reduced.

Furthermore, the diameter of the intake conduit 200 may be substantially constant along its length downstream of the PCV outlet 202. However, in other examples the diameter of the intake conduit 200 may vary along its length. It will be appreciated that the intake conduit 200, the PCV outlet 202, and the bypass duct 206 may be included in an engine system.

The PCV outlet 202 is attached to a top half of the intake conduit 200 to substantially inhibit liquids (e.g., condensate) from flowing into the PCV system. It will be appreciated that additional PCV ports (e.g., a PCV inlet) may be attached to a top half of an intake conduit.

Figure 3:
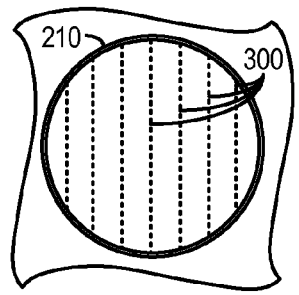
FIG. 3 shows a cross-sectional view of the condensate bypass duct illustrated in FIG. 2.

The internal volume of the bypass duct may be selected to provide a desired amount of condensate containment and metered condensate release back into the intake conduit. Additionally, the intake conduit 200 and/or the bypass duct 206 may comprise a polymeric material. The cutting plane 250 defining the cross-section shown in FIG. 3 is illustrated in FIG. 2. The cutting plane 252 defining the cross-section shown in FIG. 4 is also illustrated in FIG. 2.

FIG. 3 shows a cross-sectional view of the duct outlet 210, shown in FIG. 2. A filter 300, such as a mesh screen, may be positioned across the duct outlet 210, in one example. However, in other examples a filter may not be positioned across the duct outlet and the airflow path may be unobstructed.

Figure 4:
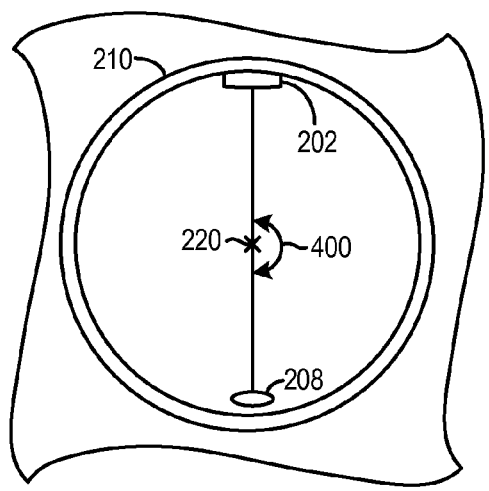
FIG. 4 shows a cross-sectional view of the intake conduit illustrated in FIG. 2.

FIG. 4 shows a cross-sectional view of the intake conduit 200, shown in FIG. 2. As shown the radial separation 400 between the PCV outlet 202 and the duct inlet 208 is 180°. The radial separation is measured about the centerline 220. Additionally, it will be appreciated that the duct outlet 210, shown in FIG. 2 may be axially aligned with the duct inlet 208. Therefore the radial separation between the PCV outlet and the duct inlet may also be 180° in some examples. However, in other examples the duct inlet and the duct outlet may be offset. Additionally, the PCV outlet 202 is shown extending into the intake conduit 200. However, in other examples the PCV outlet may not extend into the intake conduit.

Figure 5:
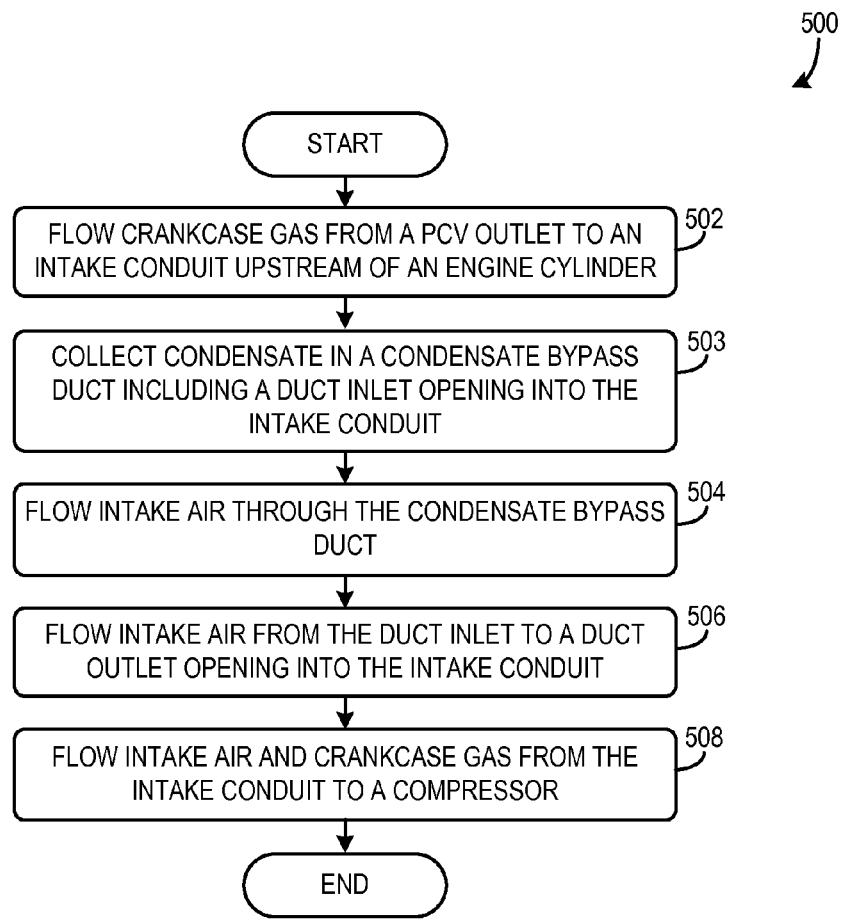
FIG. 5 shows a method for operation of a positive crankcase ventilation system.

FIG. 5 shows a method 500 for operation of a PCV system. The method 500 may be implemented via the systems and components described above with regard to FIGS. 1-3. However the method 500 may also be implemented via other suitable systems and components.

At 502 the method includes flowing crankcase gas from a PCV outlet to an intake conduit upstream of an engine cylinder. In one example, the PCV outlet is in fluidic communication with a sealed crankcase. Next at 503 the method includes collecting condensate in a condensate bypass duct including a duct inlet opening into the intake conduit. As previously discussed, the duct inlet may be positioned upstream of the PCV outlet. At 504 the method includes flowing intake air through the condensate bypass duct. At 506 the method includes flowing intake air from the duct inlet to a duct outlet opening into the intake conduit. As previously discussed, the duct outlet may be positioned downstream of the PCV outlet. Next at 508 the method includes flowing intake air and crankcase gas from the intake conduit to a compressor.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system comprising:
   an intake conduit positioned upstream of an engine cylinder;
   a PCV outlet opening into the intake conduit; and
   a condensate bypass duct in parallel fluidic communication with and vertically below the intake conduit, the condensate bypass duct including a duct inlet opening into the intake conduit and a duct outlet opening into the intake conduit, where a diameter of the condensate bypass duct decreases in a downstream direction.

2. The engine system of claim 1, where the intake conduit comprises a section that is positioned upstream of a compressor, and where the duct outlet opening is upstream of the compressor.

3. The engine system of claim 1, where the intake conduit comprises a section that is positioned upstream of a throttle.

4. The engine system of claim 1, where the diameter of the condensate bypass duct does not decrease at a constant rate.

5. The engine system of claim 1, where a section of the intake conduit extending between the inlet and outlet of the condensate bypass duct is substantially straight.

6. The engine system of claim 1, where the duct inlet opens into the intake conduit at a location upstream of the PCV outlet.

7. An engine system comprising:
   an intake conduit positioned upstream of an engine cylinder;
   a PCV outlet opening into the intake conduit; and
   a condensate bypass duct in parallel fluidic communication with and vertically below the intake conduit, the condensate bypass duct including a duct inlet opening into the intake conduit and a duct outlet opening into the intake conduit, and further comprising a filter positioned in the condensate bypass duct.

8. The engine system of claim 7, where the filter includes a mesh screen.

9. The engine system of claim 1, where the duct outlet opens into the intake conduit at a location downstream of the PCV outlet.

10. The engine system of claim 7, where the intake conduit comprises a section that is positioned upstream of a compressor, and where the duct outlet opening is upstream of the compressor.

11. The engine system of claim 7, where the intake conduit comprises a section that is positioned upstream of a throttle.

12. The engine system of claim 7, where the duct inlet opens into the intake conduit at a location upstream of the PCV outlet.

13. The engine system of claim 7, where the diameter of the condensate bypass duct does not decrease at a constant rate.

14. The engine system of claim 7, where a section of the intake conduit extending between the inlet and outlet of the condensate bypass duct is substantially straight.

15. An engine system comprising:
   an intake conduit positioned upstream of an engine cylinder;
   a PCV conduit including a PCV outlet opening into the intake conduit; and
   a condensate bypass duct in parallel fluidic communication with and vertically below the intake conduit and decreasing in diameter in a downstream direction, the condensate bypass duct including a duct inlet opening into the intake conduit and a duct outlet opening into the intake conduit.

16. The engine system of claim 15, further comprising a filter positioned in the duct outlet.

17. The engine system of claim 16, where the duct inlet and the duct outlet have an equivalent vertical height.

18. The engine system of claim 15, where a section of the intake conduit is positioned upstream of at least one of a compressor and a throttle.

19. The engine system of claim 15, where the duct inlet opens into the intake conduit at a location upstream of the PCV outlet and the duct outlet opens into the intake conduit at a location downstream of the PCV outlet.

* * * * *